Dec. 14, 1926.

H. C. BUSER 1,610,743

FLANGE PIN RETAINING CLIP

Filed July 31, 1925

WITNESSES

INVENTOR.

Patented Dec. 14, 1926.

1,610,743

UNITED STATES PATENT OFFICE.

HARRY C. BUSER, OF NEWBURGH, NEW YORK.

FLANGE-PIN-RETAINING CLIP.

Application filed July 31, 1925. Serial No. 47,330.

This invention relates to piano actions and more particularly to flange pin retaining means, designed more especially for use on the several flanges of a piano action to hold the pivot pins in place and to prevent their working out.

In a piano action there are a large number of flanges (88) with pins, and by the pins working out of place they interfere with the working of the others. Each flange of the action has a piano hammer which these pins hold; hence if one or more of the pins work out, it stops the next adjacent hammer from properly working, or causes the hammer to hit two strings instead of one, or indeed, ceases to work at all.

It is therefore an object of this invention to provide means for retaining and keeping the flange pins from working out of the flanges used in piano actions.

Another object is to provide a retaining clip which shall in addition to holding the pins in place also provide side wings for reinforcing the flanges and holding the pin in place, even if the flange should split.

Another object is to provide means by which a permanent repair of flanges may be made.

These objects are accomplished by means of the clip set forth in the annexed specifications and claim, illustrated in the accompanying drawings in which—

The several flanges B of the piano action are secured to the action rail E by the flange screws D the flanges carrying the usual pivot pins A for the hammers.

The pin retaining clip or shield which is preferably made from a single piece of metal, consists of a flat back or body portion C substantially the same length as the flange to which it is applied, and is provided with the side wings C' which embrace the side faces of the flange B; these side wings at the forward end are extended at an angle thereto to form ears F which extend over the sides of the flange and over the ends of the pivot pin A so that the latter is prevented from moving transversely in its bearings.

Figure 1:
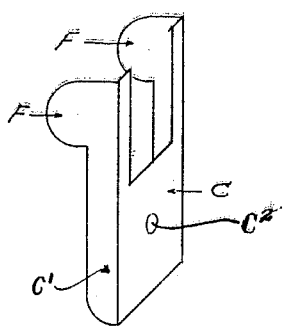
Fig. 1 is a perspective view of flange pin retaining clip, embodying my invention.
Figure 2:
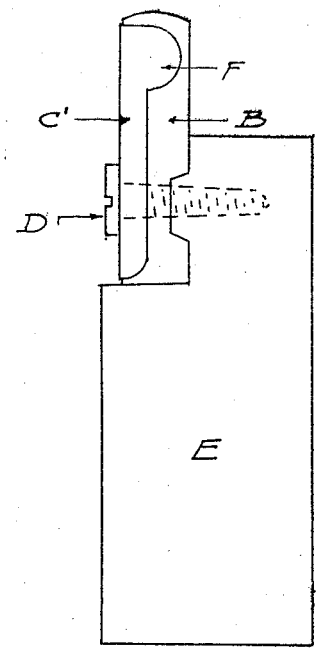
Fig. 2 is a side view of flange pin retaining clip attached to flange and held in position by means of a flange screw passing through the clip, the flange, and screwed fast to action rail.
Figure 3:
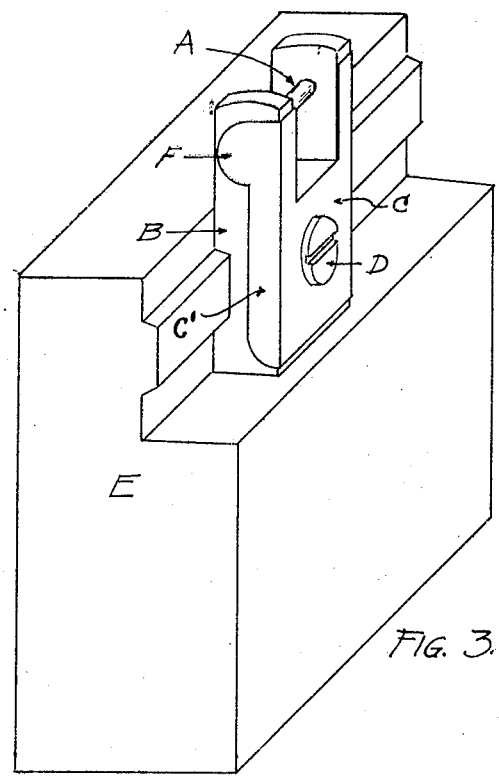
Fig. 3 is a perspective view of flange pin retaining clip attached to flange and held in position on action rail by means of a flange screw passing through the retaining clip the flange, and screwed fast to action rail.

The forward end of the back or body portion C is cut out, as shown in Figs. 1 and 3, for the passage of the pivot end of the associated swinging part held by the pin A, this cut out portion giving free access to the moving parts, so that the shield does not interfere with any such moving parts. The side wings C' greatly reinforce the flange B and guard against splitting of the flange, and in case of such splitting serve to maintain the several parts in their proper relation.

The shank of the flange screw D extends through the aperture $C^2$ in the body portion C, through the flange B and into the action rail E, the head being screwed up against the flat back securely holds the same against the flange with the wings C' embracing the sides of the flange and the ears extending over the ends of the pivot pins A.

What I claim as my invention and desire to secure by Letters Patent of the United States, is—

A flange pin retaining clip comprising a flat back for engagement with a flange and having side wings coextensive in length with and embracing the side edges of the flange, whereby to reinforce the same and prevent splitting, said back having an aperture to receive the flange screw, and means at the forward ends of said wings to retain the pivot pin.

HARRY C. BUSER.